United States Patent
Suzuki et al.

(10) Patent No.: US 11,655,152 B2
(45) Date of Patent: *May 23, 2023

(54) CARBON FOAM AND MANUFACTURING METHOD THEREOF

(71) Applicant: ASAHI KASEI KABUSHIKI KAISHA, Tokyo (JP)

(72) Inventors: Atsushi Suzuki, Tokyo (JP); Junya Yamashita, Tokyo (JP); Shozo Takada, Tokyo (JP)

(73) Assignee: ASAHI KASEI KABUSHIKI KAISHA, Tokyo (JP)

(*) Notice: Subject to any disclaimer, the term of this patent is extended or adjusted under 35 U.S.C. 154(b) by 567 days.

This patent is subject to a terminal disclaimer.

(21) Appl. No.: 16/493,445

(22) PCT Filed: Mar. 12, 2018

(86) PCT No.: PCT/JP2018/009422
§ 371 (c)(1),
(2) Date: Sep. 12, 2019

(87) PCT Pub. No.: WO2018/168741
PCT Pub. Date: Sep. 20, 2018

(65) Prior Publication Data
US 2020/0010322 A1    Jan. 9, 2020

(30) Foreign Application Priority Data
Mar. 13, 2017   (JP) ............... JP2017-047188

(51) Int. Cl.
*C01B 32/05* (2017.01)
*C04B 35/524* (2006.01)
*C04B 38/00* (2006.01)

(52) U.S. Cl.
CPC ............ *C01B 32/05* (2017.08); *C04B 35/524* (2013.01); *C04B 38/00* (2013.01); *C01P 2006/10* (2013.01); *C01P 2006/12* (2013.01)

(58) Field of Classification Search
CPC .................................................. C01B 32/05
See application file for complete search history.

(56) References Cited

U.S. PATENT DOCUMENTS

| 5,672,439 | A | 9/1997 | Wilkinson et al. | |
|---|---|---|---|---|
| 6,077,464 | A * | 6/2000 | Murdie | C04B 35/52 264/29.5 |
| 6,339,031 | B1 * | 1/2002 | Tan | C04B 38/0022 428/315.7 |
| 10,287,412 | B2 * | 5/2019 | Karthik | C04B 38/067 |
| 11,171,339 | B2 * | 11/2021 | Yamashita | H01M 8/0234 |
| 2004/0067407 | A1 | 4/2004 | Sompalli et al. | |
| 2006/0014908 | A1 | 1/2006 | Rotermund et al. | |
| 2006/0086043 | A1 | 4/2006 | Miller et al. | |
| 2014/0017595 | A1 | 1/2014 | Pillai et al. | |
| 2017/0244107 | A1 | 8/2017 | Utsunomiya et al. | |
| 2020/0161670 | A1 | 5/2020 | Yamashita et al. | |

FOREIGN PATENT DOCUMENTS

| AU | 2017364461 A1 | 6/2019 |
|---|---|---|
| CN | 1247523 A | 3/2000 |
| CN | 1681748 A | 10/2005 |
| CN | 101671197 A | 3/2010 |
| CN | 109863129 A | 6/2019 |
| EP | 3546435 A1 | 10/2019 |
| JP | S61275116 A | 12/1986 |
| JP | H04349178 A | 12/1992 |
| JP | H0632678 A | 2/1994 |
| JP | H08120600 A | 5/1996 |
| JP | H09167621 A | 6/1997 |
| JP | 2000004739 A | 1/2000 |
| JP | 2001085028 A | 3/2001 |
| JP | 2002326871 A | 11/2002 |
| JP | 2004217446 A | 8/2004 |
| JP | 2005041748 A | 2/2005 |
| JP | 2006502548 A | 1/2006 |
| JP | 2006512265 A | 4/2006 |
| JP | 2006117507 A | 5/2006 |
| JP | 2006245253 A | 9/2006 |
| JP | 2007269505 A | 10/2007 |
| JP | 2009132602 A | 6/2009 |
| JP | 2010006628 A | 1/2010 |
| JP | 2014514697 A | 6/2014 |
| KR | 1020190040270 A | 4/2019 |
| WO | 2016060045 A1 | 4/2016 |

OTHER PUBLICATIONS

Gibson, Cellular Solids—Structure & Properties Pergamon Press pp. 15-51 (1997). (Year: 1997).*
Sep. 17, 2019, International Preliminary Report on Patentability issued in the International Patent Application No. PCT/JP2018/009422.
Feb. 19, 2020, Supplementary European Search Report issued by the European Patent Office in the corresponding European Patent Application No. 18766781.1.
Apr. 17, 2018, International Search Report issued in the International Patent Application No. PCT/JP2018/009422.
Shuiliang Chen et al., Elastic carbon foam via direct carbonization of polymer foam for flexible electrodes and organic chemical absorption, Energy & Environmental Science, 2013, pp. 2435-2439, vol. 6, RSC Publishing.
Tung Ngoc Pham, Three-dimensional structured carbon foam: Synthesis and Applications, Doctoral thesis, Department of Chemistry, 2016, Umeå University.

* cited by examiner

*Primary Examiner* — Stuart L Hendrickson
(74) *Attorney, Agent, or Firm* — Kenja IP Law PC

(57) ABSTRACT

A carbon foam comprising linear portions and node portions joining the linear portions, wherein the linear portions have a diameter of 0.1 μm or more and 10.0 μm or less, and the carbon foam has a surface with an area of 100 cm² or more.

14 Claims, 6 Drawing Sheets

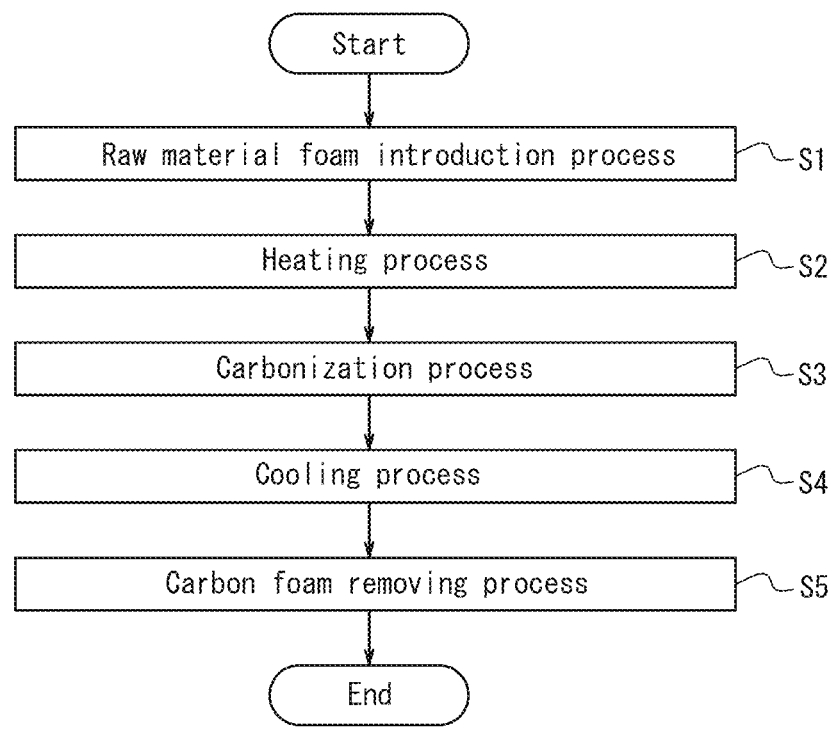

CARBON FOAM AND MANUFACTURING METHOD THEREOF

TECHNICAL FIELD

This disclosure relates to a carbon foam and a manufacturing method thereof, and particularly to a carbon foam having a surface with a large area and no defects and a manufacturing method thereof.

BACKGROUND

Carbon foam is a material obtained, for example, by heat treating and carbonizing a melamine resin foam (foam) in an inert gas atmosphere (for example, see JP H04-349178 A (PTL 1)), and it is used for various applications because of its porosity, flexibility and electrical properties. The carbon foam is significantly different from common carbon fiber nonwoven fabric in the following aspects: the carbon foam has a narrow fiber diameter, so that its specific surface area is large; and the carbon foam has an integral structure in which all the fibers are connected.

For example, JP 2002-326871 A (PTL 2) describes using carbon foam as a filter which is used under special conditions such as high temperatures or drug uses. In addition, JP 2004-217446 A (JPL 3) describes using carbon foam as a heat insulating material having high heat insulating properties even at high temperatures. Furthermore, JP H09-167621 A (PTL 4) describes using carbon foam as an electrode having high electrical activity and conductivity.

CITATION LIST

Patent Literature

PTL 1: JP H04-349178 A
PTL 2: JP 2002-326871 A
PTL 3: JP 2004-217446 A
PTL 4: JP H09-167621 A

SUMMARY

Technical Problem

However, in the case of using carbon foam as an electrode as described above, cells are often made with an area of 100 cm$^2$ or more (hereinafter, also referred to as "large area"), and therefore requires a carbon foam having a surface with a large area. The carbon foam having a surface with a large area is also required in the case of using carbon foam as a filter with a large diameter.

However, arranging a plurality of conventional carbon foams to form an electrode or a filter with a large area cannot provide sufficient properties.

It could thus be helpful to provide a carbon foam with good properties and a manufacturing method thereof.

Solution to Problem

After intensive study, we have discovered that, when an electrode with a large area is prepared by arranging a plurality of carbon foams, there remains a large number of locations where the carbon fibers constituting the carbon foam are not connected, such as through holes inside the carbon foam and the space between adjacent carbon foams, which deteriorates the conductivity.

We have also discovered that, when a filter with a large area is prepared by arranging a plurality of carbon foams, substance to be collected may pass through at the locations where the carbon fibers constituting the carbon foam are not connected, such as through holes inside the carbon foam and the space between adjacent carbon foams, which deteriorates the performance of the filter.

In other words, we have discovered that the locations where the carbon fibers constituting the carbon foam are not connected, such as through holes inside the carbon foam and the space between carbon foams, deteriorate the properties.

However, the carbon foam having a surface with a large area prepared with the method of PTL 1 has large defects (through holes). In order to provide a method of preparing a carbon foam having a surface with a large area and no defects as a single member, we analyzed and studied the mechanism of occurrence of defect during the preparation of carbon foam having a surface with a large area with the method of PTL 1.

During the preparation of carbon foam, a resin foam as a raw material is carbonized in an inert gas atmosphere or in a vacuum. The main reason is that oxygen in the air will react with carbon fibers obtained by carbonization, and an inert gas atmosphere or a vacuum can prevent the carbon fibers from burning out. The method of PTL 1 thus can prevent the carbon fibers from burning out, yet defects still occur.

Therefore, we investigated in detail the cause of defects with the method of PTL 1. As a result, we discovered that when the resin foam as a raw material is heated, gas is desorbed from the resin foam, and the desorbed gas functions as an active gas, reacts with the carbon fibers and decomposes, thereby causing defects.

The decomposition gas is also generated during the preparation of a small carbon foam. However, it is considered that, during the preparation of a carbon foam with a small area, the decomposition gas, because of natural diffusion, is discharged outside the foam structure before reacting with the carbon fibers, and therefore no defects occur.

On the other hand, during the preparation of a carbon foam having a surface with a large area, the area of the resin foam as a raw material is large, and the diffusion distance of the decomposition gas generated inside the resin foam to the outside of the foam structure is long, so that the desorbed gas reacts with the carbon fibers and decomposes before it diffuses out of the foam structure, thereby causing defects.

Therefore, we made an intensive study on the conditions for manufacturing a carbon foam having a surface with a large area without causing the defects. As a result, we discovered that it is extremely effective to promote the diffusion of decomposition gas generated inside the resin foam to the outside of the foam structure by decompressing and evacuating the inside of a heat treatment furnace in a temperature range where a large amount of decomposition gas is generated during the heating and carbonization of the resin foam. The present disclosure is completed based on this discovery.

Specifically, the present disclosure provides the following.

[1] A carbon foam comprising linear portions and node portions joining the linear portions, wherein
the linear portions have a diameter of 0.1 μm or more and 10.0 μm or less, and
the carbon foam has a surface with an area of 100 cm$^2$ or more.

[2] A carbon foam comprising linear portions and node portions joining the linear portions, wherein the linear portions have a diameter of 0.1 µm or more and 10.0 µm or less, and the carbon foam has no through holes with an area of 2000 mm$^2$ or more.

[3] The carbon foam according to [1] or [2], wherein the carbon foam comprises a region of 4000 mm$^2$ or more having no through holes with an area of 2000 mm$^2$ or more.

[4] The carbon foam according to any one of [1] to [3], wherein a ratio of the number of the linear portions to the number of the node portions is 1.3 or more and 1.6 or less.

[5] The carbon foam according to any one of [1] to [4], having no through holes with an area of 1000 mm$^2$ or more.

[6] The carbon foam according to any one of [1] to [5], wherein at least a part of the carbon foam has a density of the node portions of 15,000/mm$^3$ or more.

[7] The carbon foam according to any one of [1] to [6], having a bulk density of 3.0 kgm$^{-3}$ or more and 400 kgm$^{-3}$ or less.

[8] The carbon foam according to any one of [1] to [7], wherein the linear portions have a diameter of 0.1 µm or more and 5.0 µm or less.

[9] The carbon foam according to any one of [1] to [8], wherein the linear portions have a diameter of 1.0 µm or more and 5.0 µm or less.

[10] The carbon foam according to any one of [1] to [9], wherein the carbon foam has a surface area of 60000 cm$^2$ or less.

[11] The carbon foam according to any one of [1] to [10], having a carbon content of 51 mass % or more.

[12] The carbon foam according to any one of [1] to [11], wherein at least a part of the carbon foam has a density of the node portions of 30,000/mm$^3$ or more.

[13] The carbon foam according to any one of [1] to [12], wherein in at least a part of the carbon foam, a thickness direction of the carbon foam is defined as x direction, a direction perpendicular to the x direction is defined as y direction, and a direction perpendicular to the x direction and the y direction is defined as z direction, and for the linear portions in a region of 300 µm×300 µm×300 µm, an average value of orientation angle with respect to the x direction is defined as $\theta_{avex}$, an average value of orientation angle with respect to the y direction is defined as $\theta_{avey}$, and an average value of orientation angle with respect to the z direction is defined as $\theta_{avez}$, then a difference $\theta_d$ between the maximum value and the minimum value of the $\theta_{avex}$, the $\theta_{avey}$ and the $\theta_{avez}$ is 3° or more.

[14] A method of manufacturing a carbon foam having a surface with an area of 100 cm$^2$ or more and 60000 cm$^2$ or less, comprising a raw material foam introduction process where a resin foam, which is a raw material of carbon foam, is introduced into a heat treatment furnace; and a heating process where a temperature inside the heat treatment furnace is raised to a heat treatment temperature at a first heating rate; wherein at least a part of the heating process with a temperature higher than 200° C. is performed while decompressing and evacuating the inside of the heat treatment furnace.

[15] The method of manufacturing a carbon foam according to [14], wherein the heating process is performed while decompressing and evacuating the inside of the heat treatment furnace at least in a first temperature range where a large amount of decomposition gas is generated from the resin foam.

[16] The method of manufacturing a carbon foam according to [14] or [15], wherein the heating process is performed while supplying inert gas into the heat treatment furnace in the first temperature range.

[17] The method of manufacturing a carbon foam according to any one of [14] to [16], comprising a raw material foam introduction process where a resin foam, which is a raw material of carbon foam, is introduced into a heat treatment furnace;

a heating process where a temperature inside the heat treatment furnace is raised to a heat treatment temperature at a first heating rate;

a carbonization process where the resin foam is kept at the heat treatment temperature for a predetermined time and carbonized to obtain the carbon foam;

a cooling process where the temperature inside the heat treatment furnace is lowered to room temperature; and a carbon foam removing process where the carbon foam is removed from the heat treatment furnace, wherein the heating process is performed while decompressing and evacuating the inside of the heat treatment furnace at least in a first temperature range where a large amount of decomposition gas is generated from the resin foam.

[18] The method of manufacturing a carbon foam according to any one of [14] to [17], wherein the heating process is performed at a second heating rate lower than the first heating rate in the first temperature range.

[19] The method of manufacturing a carbon foam according to [18], wherein the heating process is performed at a third heating rate even lower than the second heating rate in a second temperature range where an increasing rate of amount of desorbed gas generated from the resin foam is high within the first temperature range.

[20] The method of manufacturing a carbon foam according to [19], wherein the second temperature range is a temperature range where a weight of the resin foam decreases by 20% or more of an initial weight per 100° C.

[21] The method of manufacturing a carbon foam according to any one of [14] to [20], wherein the first temperature range is a temperature range where a weight of the resin foam decreases by 5% or more of an initial weight per 100° C.

[22] The method of manufacturing a carbon foam according to any one of [14] to [21], wherein the resin foam is a melamine resin foam.

[23] The method of manufacturing a carbon foam according to any one of [14] to [22], wherein the first temperature range is a temperature range of 200° C. or higher and lower than 800° C.

[24] The method of manufacturing a carbon foam according to any one of [14] to [23], wherein the heating process and the carbonization process are performed while applying a compressive stress to the resin foam.

Advantageous Effect

According to the present disclosure, it is possible to provide a carbon foam with good properties and a manufacturing method thereof.

BRIEF DESCRIPTION OF THE DRAWINGS

In the accompanying drawings:

FIGS. 1A and 1B illustrate examples of carbon foams included in the present disclosure, and FIGS. 1C and 1D illustrate examples of carbon foams not included in the present disclosure;

FIG. 2 is a flowchart of the method of manufacturing a carbon foam of the present disclosure;

FIG. 7A is an image of a cross section and FIG. 7B is an image of a surface;

DETAILED DESCRIPTION

Figure 1A:
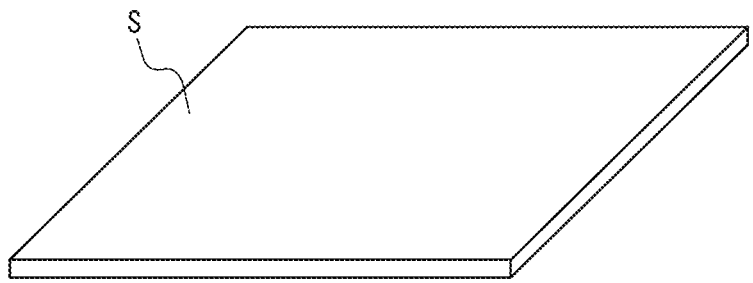
FIGS. 1A to 1D illustrate examples of carbon foams included in the present disclosure and examples of carbon foams not included in the present disclosure, where

The following provides a detailed description of an embodiment of the present disclosure (hereinafter, referred to as "present embodiment"). However, the present disclosure is not limited by the following description and may be implemented with various alterations within the essential scope thereof.

(Carbon Foam)

The carbon foam of the present disclosure has linear portions and node portions joining the linear portions, where the linear portions (carbon fibers) have a diameter of 0.1 μm or more and 10.0 μm or less, and the carbon foam has a surface with an area of 100 cm$^2$ or more.

The carbon foam of the present disclosure has a surface with an area of 100 cm$^2$ or more from the viewpoint of versatility, and the area of the surface is preferably 225 cm$^2$ or more and more preferably 600 cm$^2$ or more. In addition, from the viewpoint of productivity, the surface area of the carbon foam is preferably 60000 cm$^2$ or less, more preferably 50000 cm$^2$ or less, still more preferably 30000 cm$^2$ or less, and further preferably 25000 cm$^2$ or less.

Another aspect of the carbon foam of the present disclosure has linear portions and node portions joining the linear portions, where the linear portions have a diameter of 0.1 μm or more and 10.0 μm or less, and the carbon foam has no through holes with an area of 2000 mm$^2$ or more. The carbon foam of the present disclosure is composed of a single member without defects. In the present disclosure, "defect" means a through hole H that passes through the surface S with an area of 100 cm$^2$ or more, penetrates the carbon foam, and has an area of 2000 mm$^2$ or more on the surface S. That is, the carbon foam of the present disclosure does not include any through holes H with an area of 2000 mm$^2$ or more on the surface S. Note that the surface S means a surface composed of a single face, and does not include a surface composed of a plurality of adjacent faces of a polyhedral surface, for example.

In the present disclosure, the presence or absence of the through hole H is evaluated by visual inspection and inspection using an inspection device including a light source and a photodetector (for example, a pinhole inspection machine). Specifically, the surface S is first visually observed to evaluate the presence or absence of the through hole H. When the presence of the through hole H cannot be visually confirmed, the surface S is inspected by an inspection device. Specifically, a light source is arranged on the surface S side of the carbon foam, and a photodetector is arranged on a surface side opposite to the surface S. Then, light is irradiated from the light source toward the surface S of the carbon foam. In the case where the carbon foam includes the through hole H, the irradiated light passes through the through hole H and reaches the photodetector. The through hole H can be detected in this way. The arrangement of the light source and the photodetector may be reversed. An inspection device, such as a commercially available pinhole inspection machine, can detect pinholes with a diameter of several μm. Therefore, the inspection device can reliably detect a through hole with an area of 2000 mm$^2$ or more, even the through hole is missed in the visual inspection.

When the inspection detects a through hole H, the area of the through hole H on the surface S is measured. The area can be measured by a microscope or an electron microscope. In the present disclosure, a carbon foam where the inspection using the light source and photodetector detects no through hole H, and a carbon foam where all the detected through holes H have an area of less than 2000 mm$^2$, are regarded as carbon foams without defects and are included in the present disclosure. On the other hand, a carbon foam having a through hole with an area of 2000 mm$^2$ or more is regarded as a defective carbon foam and is not included in the present disclosure.

Note that the shape of the through hole H is not limited, and a crack and a line are also included in the through hole H. In addition, a hole drilled by post-processing at the time of use, such as a hole drilled by a process after the carbon foam production in order to incorporate the carbon foam into a cell, is not a defect and is not included in the through hole of the present disclosure.

For a carbon foam having a plurality of through holes H on the surface S, it is included in the present disclosure if all the through holes have an area of less than 2000 mm$^2$, and not included in the present disclosure if one or more through holes have an area of 2000 mm$^2$ or more.

From the viewpoint of electrode strength, the carbon foam of the present embodiment has no through holes with an area of 2000 mm$^2$ or more. The carbon foam preferably has no through holes with an area of 1000 mm$^2$ or more, more preferably has no through holes with an area of 500 mm$^2$ or more, still more preferably has no through holes with an area of 100 mm$^2$ or more, and further preferably has no through holes with an area of 10 mm$^2$ or more.

In addition, from the viewpoint of the strength and handleability when used as an electrode, the carbon foam of the present embodiment preferably has a region of 4000 mm$^2$ or more without through holes of 2000 mm$^2$ or more. The region is more preferably 6000 mm$^2$ or more, still more preferably 8000 mm$^2$ or more, and further preferably 10000 mm$^2$ or more.

The carbon foam of the present embodiment preferably has a region of 2000 mm$^2$ or more without through holes of 1000 mm$^2$ or more. The region is more preferably 4000 mm$^2$ or more, still more preferably 6000 mm$^2$ or more, further preferably 8000 mm$^2$ or more, and particularly preferably 10000 mm$^2$ or more.

The carbon foam of the present embodiment preferably has a region of 1000 mm$^2$ or more without through holes of 500 mm² or more. The region is more preferably 2000 mm² or more, 4000 mm² or more, 6000 mm² or more, 8000 mm² or more, or 10000 mm² or more.

The carbon foam of the present embodiment preferably has a region of 200 mm² or more without through holes of 100 mm² or more. The region is more preferably 500 mm² or more, 1000 mm² or more, 2000 mm² or more, 4000 mm² or more, 6000 mm² or more, 8000 mm² or more, or 10000 mm² or more.

The carbon foam of the present embodiment preferably has a region of 20 mm² or more without through holes of 10 mm² or more. The region is more preferably 100 mm² or more, 500 mm² or more, 1000 mm² or more, 2000 mm² or more, 4000 mm² or more, 6000 mm² or more, 8000 mm² or more, or 10000 mm² or more.

Figure 1B:
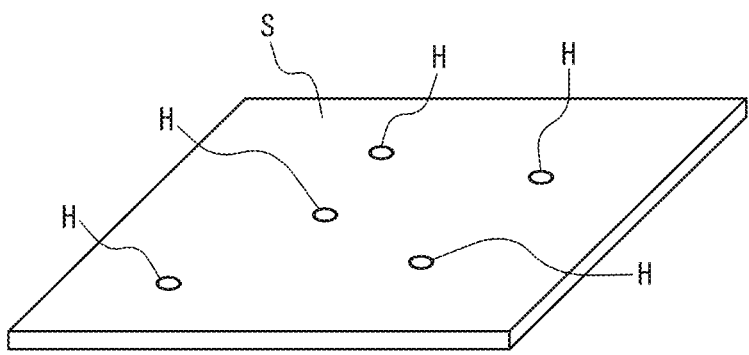
Figure 1C:
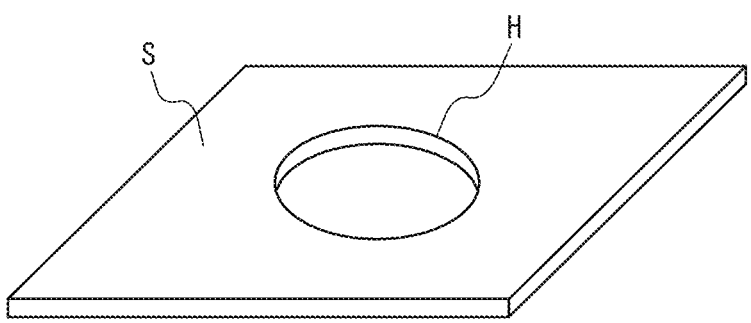
Figure 1D:
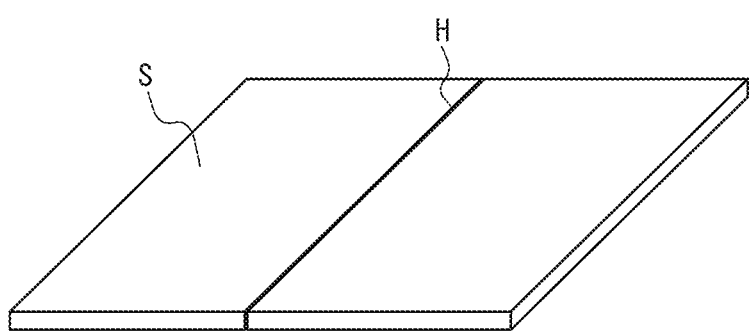

FIGS. 1A to 1D illustrate examples of carbon foams included in the present disclosure and examples of carbon foams not included in the present disclosure, where FIGS. 1A and 1B illustrate examples of carbon foams included in the present disclosure, and FIGS. 1C and 1D illustrate examples of carbon foams not included in the present disclosure, respectively. The carbon foam illustrated in FIG. 1A has no through holes H, and is a carbon foam without defects. For the carbon foam illustrated in FIG. 1B, although it has some through holes H, all the through holes are smaller than 500 mm². When a carbon foam having through holes of such a small area is used as a battery electrode, the current flowing through the carbon foam only needs to make a small detour around the through holes, so that the influence on the conductivity is small. Therefore, the carbon foams illustrated in FIGS. 1A and 1B are included in the present disclosure.

On the other hand, the carbon foam illustrated in FIG. 1C has one through hole H with an area of 2000 mm² or more. In this case, when the carbon foam is used as a battery electrode, the current flowing through the carbon foam has to make a wide detour around the through hole, so that the resistance value is increased and the conductivity is deteriorated. In addition, the carbon foam illustrated in FIG. 1D has a linear through hole that divides the carbon foam. In this case, the area of the contacting part of the carbon foam is small. Therefore, when the carbon foam is used as a battery electrode, the resistance value of the current flowing through the carbon foam is increased and the conductivity is deteriorated. Therefore, the carbon foams illustrated in FIGS. 1C and 1D are not included in the present disclosure.

Although all the carbon foams illustrated in FIGS. 1A to 1D are in a plate shape, the shape of the carbon foam is not limited thereto, and may be, for example, a cylindrical shape. When the carbon foam is in a cylindrical shape, the surface S with an area of 100 cm² or more may be a curved surface.

In addition, the surface S may be subjected to a process such as embossing. In this case, the area of the surface S is defined by the area viewed from the vertical direction of the surface without taking into account the surface area increased by embossing.

<Ratio R of the Number $N_l$ of Linear Portions to the Number $N_n$ of Node Portions>

For the carbon foam of the present embodiment, the ratio R of the number $N_l$ of the linear portions to the number $N_n$ of the node portions is preferably 1.3 or more and 1.6 or less. The ratio R is, in other words, the average number of branches branching at a node portion. When R is less than 1.3, it leads to a structure where unjoined linear portions are in contact such as nonwoven fabric, instead of a three-dimensional network structure where linear portions are joined by node portions. Therefore, R is 1.3 or more. On the other hand, when R is more than 1.6, it leads to a porous structure covered with, for example, a honeycomb-like wall surface where linear portions are in a belt shape. Therefore, R is 1.6 or less. The ratio R of the number $N_l$ of the linear portions to the number $N_n$ of the node portions is more preferably 1.35 or more and still more preferably 1.4 or more. In addition, R is more preferably 1.55 or less and still more preferably 1.5 or less.

<Diameter of Linear Portion (Carbon Fiber)>

For the carbon foam of the present embodiment, the diameter d of the linear portion (carbon fiber) of the carbon foam is 0.1 μm or more and 10.0 μm or less. In the present disclosure, "diameter of the carbon fiber" refers to the diameter of a linear portion connecting node portions. From the viewpoint of guaranteeing physical strength and conductivity, the diameter of the carbon fiber is 0.1 μm or more, preferably 1.0 μm or more, more preferably 1.5 μm or more, and still more preferably 2 μm or more. In addition, from the viewpoint of the deformability and resilience of compression behavior, the diameter of the carbon fiber is 10.0 μm or less, preferably 5.0 μm or less, more preferably 4 μm or less, and still more preferably 3.5 μm or less.

[Method of Measuring Diameter of Linear Portion (Carbon Fiber)]

The diameter d of the linear portion (carbon fiber) of the carbon foam is determined by image analysis of a scanning electron microscope (SEM) image. Specifically, the carbon foam is observed at a magnification of 10,000 using a scanning electron microscope. Twenty locations are randomly selected on the obtained observation image, and the thickness of the carbon fiber at these locations is measured. Assuming that the cross section is in a circular shape, the average thickness is taken as the diameter d.

<Orientation Angle of Linear Portion>

For example, when a melamine resin foam is heat treated and carbonized in a heat treatment furnace, the obtained carbon foam has an isotropic structure in which carbon fibers constituting the skeleton of the carbon foam are evenly spread in all directions. For the linear portions in a region of 300 μm×300 μm×300 μm in such a carbon foam, if the average value of orientation angle of the linear portions with respect to the x direction is defined as $\theta_{avex}$, the average value of orientation angle with respect to the y direction is defined as $\theta_{avey}$, and the average value of orientation angle with respect to the z direction is defined as $\theta_{avez}$, then the difference $\theta_d$ between the maximum value and the minimum value of $\theta_{avex}$, $\theta_{avey}$ and $\theta_{avez}$ is usually 1° or less.

In the three directions, the thickness direction of the carbon foam is defined as the x direction, the direction perpendicular to the x direction is defined as the y direction, and the direction perpendicular to the x direction and the y direction is defined as the z direction.

However, when the melamine resin foam is heat treated and carbonized, applying a compressive stress to the resin foam, which is a raw material of carbon foam, will lead to a carbon foam having a skeleton structure in which carbon fibers spread anisotropically. This carbon foam is capable of suppressing breakage of carbon fibers (linear portions), reducing pulverization, and realizing high resilience even when a compressive load is applied thereon. In order to obtain this effect, the difference $\theta_d$ is preferably 3° or more. The difference $\theta_d$ is preferably 5° or more and more preferably 8° or more.

It is preferable that at least a part of the carbon foam of the present embodiment include a region of length 300

μm×width 300 μm×height 300 μm which satisfies the above provisions of $\theta_{avex}$, $\theta_{avey}$ and $\theta_{avez}$. It is more preferable that 50 vol. % of the carbon foam satisfy the above angle provisions, still more preferable that 75 vol. % of the carbon foam satisfy the above density ranges, and particularly preferable that any location in the carbon foam satisfy the above angle provisions.

<Density of Node Portion>

From the viewpoint of the resilience when applied with a compressive load, the density of the node portions of the carbon foam of the present embodiment is preferably 15,000/mm³ or more, more preferably 20,000/mm³ or more, and still more preferably 30,000/mm³ or more. In addition, from the viewpoint of the flexibility of the carbon foam, it is preferably 5,000,000/mm³ or less, more preferably 3,000,000/mm³ or less, and still more preferably 2,000,000/mm³ or less.

It is preferable that at least a part of the carbon foam of the present embodiment have a location satisfying the above node portion density ranges. It is more preferable that 50 vol. % of the carbon foam satisfy the above density ranges, still more preferable that 75 vol. % of the carbon foam satisfy the above density ranges, and particularly preferable that any location in the carbon foam satisfy the above density ranges.

In the present specification, the number $N_n$ of the node portions, the number $N_l$ of the linear portions, the density of the node portions, and the orientation angle $\theta$ are obtained by imaging the carbon foam using an X-ray computerized tomography (CT) apparatus, subjecting the obtained tomogram data to median filter treatment as preprocessing, then using OTSU's binarization algorithm (see Nobuyuki OTSU, "Automatic Threshold Selection Method based on Discrimination and Least Squares Criterion", The IEICE Transactions D, Vol. J63-D, No. 4, pp. 346-356 (1980)) to divide the region into structure and space to obtain a three-dimensional image of the structure including the inside of the carbon foam, and using the obtained three-dimensional image and structural analysis software to determine the values.

Specifically, the number $N_n$ of the node portions and the number $N_l$ of the linear portions are determined by detecting the node portions and the linear portions included in the three-dimensional image obtained as described above, and counting the numbers thereof. With the obtained $N_n$ and $N_l$, the ratio R of $N_l$ to $N_n$ can be determined.

Furthermore, the orientation angle $\theta$ of a linear portion is an angle between a straight line connecting the node portions at two ends of the linear portion and each direction, and is determined for each of the three mutually orthogonal directions in the three-dimensional image. The average value of orientation angle of the linear portions is determined for each direction.

A CT apparatus with low-energy and high-brightness X-rays such as a high-resolution 3D X-ray microscope nano3DX manufactured by Rigaku Corporation may be used as the CT apparatus for carbon foam structural analysis. For the image processing and structural analysis, Centerline Editor of Simpleware software manufactured by JSOL Corporation, for example, may be used.

Specifically, the number $N_n$ of the node portions, the number $N_l$ of the linear portions, the density of the node portions, and the orientation angle $\theta$ may be measured with the measurement methods described in the EXAMPLES section.

<Carbon Content>

From the viewpoint of conductivity, the carbon content of the carbon foam of the present embodiment is preferably 51 mass % or more, 60 mass % or more, 65 mass % or more, 70 mass % or more, 75 mass % or more, 80 mass % or more, 85 mass % or more, or 90 mass % or more. The upper limit is not particularly limited, yet it may be 100 mass % or less, 99 mass % or less, or 98 mass % or less.

The carbon content of the carbon foam can be determined by X-ray fluorescence measurement.

<Porosity>

From the viewpoint of flexibility, the porosity of the carbon foam of the present embodiment is preferably 50% or more, more preferably 60% or more, and still more preferably 70% or more. In the present specification, the porosity is a value determined from bulk density and real density. Bulk density is a density based on the volume including the pores in the carbon foam. On the other hand, real density is a density based on the volume occupied by the material of the carbon foam.

[Measurement of Bulk Density]

First, the dimensions of the carbon foam are measured using vernier calipers or the like, and the obtained dimensions are used to determine the bulk volume $V_{bulk}$ of the carbon foam. Next, the mass M of the carbon foam is measured using a precision balance. With the obtained mass M and bulk volume $V_{bulk}$, the bulk density $\rho_{bulk}$ of the carbon foam can be determined using the following equation (1).

$$\rho_{bulk} = M/V_{bulk} \tag{1}$$

From the viewpoint of reducing the resistance as an electrode, the bulk density is preferably 3.0 kgm⁻³ or more, more preferably 3.5 kgm⁻³ or more, and still more preferably 4.0 kgm⁻³ or more. In addition, from the viewpoint of the flexibility of the carbon foam, it is preferably 400 kgm⁻³ or less, more preferably 300 kgm⁻³ or less, and still more preferably 200 kgm⁻³ or less.

[Measurement of Real Density]

The real density $\rho_{real}$ of the carbon foam can be determined with the sink-float method using a mixed solution of n-heptane, carbon tetrachloride and ethylene dibromide. Specifically, carbon foam of an appropriate size is inserted into a stoppered test tube first. Next, three solvents are appropriately mixed and added to the test tube, and the test tube is soaked in a thermostat bath at 30° C. If the specimen comes up, then the low-density n-heptane is added. On the other hand, if the specimen sinks down, then the high-density ethylene dibromide is added. This operation is repeated until the specimen floats in the liquid. Finally, the density of the liquid is measured using a Gay-Lussac pycnometer.

[Calculation of Porosity]

With the bulk density $\rho_{bulk}$ and the real density $\rho_{real}$ determined as described above, the porosity $V_{f,pore}$ can be determined using the following equation (2).

$$V_{f,pore} = ((1/\rho_{bulk}) - (1/\rho_{real}))/(1/\rho_{bulk}) \times 100 (\%) \tag{2}$$

<Crystallite Size>

The crystallite size Lc of the carbon foam of the present embodiment is preferably 1.1 nm or more, and more preferably 1.5 nm or more from the viewpoint of conductivity. In addition, from the viewpoint of physical fragility, it is preferably 4.0 nm or less and more preferably 3.0 nm or less.

As described above, the carbon foam of the present disclosure has a surface with a large area and no defects, and, for example, when the carbon foam is used as a battery electrode, it has high conductivity as compared with an electrode formed by arranging carbon foams having a small surface area. In addition, when the carbon foam is used as a filter, it can collect the substance to be collected without missing anything, as compared with a filter formed by arranging carbon foams having a small surface area.

(Method of Manufacturing Carbon Foam)

The method of manufacturing a carbon foam of the present disclosure is a method of manufacturing a carbon foam having a surface with an area of 100 cm$^2$ or more and 60000 cm$^2$ or less, including: a raw material foam introduction process where a resin foam, which is a raw material of carbon foam, is introduced into a heat treatment furnace, and a heating process where a temperature inside the heat treatment furnace is raised to a heat treatment temperature at a first heating rate, wherein at least a part of the heating process with a temperature higher than 200° C. is performed while decompressing and evacuating the inside of the heat treatment furnace.

In addition, the method of manufacturing a carbon foam of the present disclosure may include a carbonization process where the resin foam is kept at the heat treatment temperature for a predetermined time and carbonized to obtain a carbon foam, a cooling process where the temperature inside the heat treatment furnace is lowered to room temperature, and a carbon foam removing process where the carbon foam is removed from the heat treatment furnace.

FIG. 2 illustrates a flow chart of the method of manufacturing a carbon foam of the present disclosure. First, in step S1, a resin foam, which is a raw material of carbon foam, is introduced into a heat treatment furnace (raw material foam introduction process).

The resin foam as a raw material of carbon foam may be any resin foam known as a raw material of carbon foam. For example, in the case where the resin foam as a raw material is a melamine resin foam, a melamine/formaldehyde condensation foam manufactured with the method described in JP H04-349178 A may be used as the melamine resin foam, for example.

According to the method, an aqueous solution or dispersion containing a melamine/formaldehyde precondensate, an emulsifier, a volatile foaming agent, a curing agent, and, if necessary, a well-known filler is first subjected to foaming treatment and then curing treatment to obtain a melamine/formaldehyde condensation foam.

In this method, the melamine/formaldehyde precondensate may be one having a ratio of melamine:formaldehyde=1:1.5 to 1:4, and an average molecular weight of 200 to 1000, for example. In addition, examples of the emulsifier include 0.5 mass % to 5 mass % (based on the melamine/formaldehyde precondensate, the same applies to the following description) of sodium salts of alkyl sulfonic acid and aryl sulfonic acid; examples of the volatile foaming agent include 1 mass % to 50 mass % of pentane and hexane; and examples of the curing agent include 0.01 mass % to 20 mass % of hydrochloric acid and sulfuric acid. In the foaming treatment and the curing treatment, the solution containing the above components may be heated to a temperature set in accordance with the type of the used volatile foaming agent and the like.

In addition, the heat treatment furnace for carbonizing the resin foam as a raw material is not limited as long as it is a furnace capable of carbonizing the resin foam to obtain a carbon foam. Examples thereof include a heat treatment furnace including a reaction furnace for holding a resin foam as a raw material, a heater for heating the inside of the reaction furnace, a gas introduction port for introducing inert gas into the reaction furnace, a gas discharge port for discharging gas from the reaction furnace, and a vacuum pump for decompressing the inside of the reaction furnace and making it into a vacuum.

Next, in step S2, the temperature inside the heat treatment furnace is raised to a predetermined heat treatment temperature at a first heating rate (heating process). At that time, it is important to perform at least a part of the process with a temperature higher than 200° C. while decompressing and evacuating the inside of the heat treatment furnace. Furthermore, it is preferable to perform the process while decompressing and evacuating the inside of the heat treatment furnace in a first temperature range where the amount of decomposition gas generated from the resin foam is large.

As described above, when the resin foam as a raw material of carbon foam is heated, the active decomposition gas generated from the resin foam reacts with the carbon fibers constituting a carbon foam and decomposes, and defects occur in the carbon foam. The generation amount of the decomposition gas depends on the temperature inside the furnace. Therefore, in the present disclosure, at least a part of the heating process with a temperature higher than 200° C. is performed while decompressing and evacuating the inside of the heat treatment furnace, and it is preferable to further decompress and evacuate the inside of the heat treatment furnace in a temperature range where a large amount of decomposition gas is generated from the resin foam (first temperature range). In this way, it is possible to promote the diffusion of the decomposition gas generated inside the resin foam to the outside of the resin foam, and to prevent the formation of defects in the carbon foam.

In the present disclosure, the "temperature range where a large amount of decomposition gas is generated from the resin foam (first temperature range)" can be evaluated by heating 1.000 g of the resin foam in an oven purged with inert gas, and for each temperature, holding the resin foam at that temperature for one hour, then cooling the resin foam to room temperature, taking the resin foam out and weighing its weight, and comparing the obtained weight with an initial weight measured at room temperature before the heating. Specifically, the weight of the resin foam as a raw material in the heating process is monitored in advance at intervals of 100° C., and the first temperature range is a temperature range where the weight of the resin foam decreases by 5% or more of the initial weight per 100° C. For example, in the case where the weight of the resin foam decreases by 5% or more of the initial weight per 100° C. in all temperature ranges of 300° C. or higher and lower than 400° C., 400° C. or higher and lower than 500° C., and 500° C. or higher and lower than 600° C., the first temperature range is 300° C. or higher and lower than 600° C.

As a result of our investigation, it was understood that, in the case of using a melamine resin foam as the resin foam, the temperature range with a large amount of decomposition gas (first temperature range) is a temperature range of 200° C. or higher and lower than 800° C. Therefore, in the case of using a melamine resin foam as the resin foam, for example, the heat treatment furnace is decompressed and evacuated at least in the first temperature range.

The decompression and evacuation can be performed by an evacuation means such as a vacuum pump. However, the pump used should have at least an evacuation ability capable of reducing the pressure inside the furnace to 1 Pa or less within 10 minutes.

In the case where the resin foam as a raw material is a melamine resin foam, for example, the heating rate up to the heat treatment temperature (first heating rate) is preferably 10° C./min or lower from the viewpoint of suppressing the generation amount of decomposition gas. In addition, the first heating rate is preferably 1° C./min or higher from the viewpoint of overall productivity.

It is preferable to perform the heating process at a heating rate (second heating rate) lower than the heating rate up to the heat treatment temperature (first heating rate) in the temperature range where a large amount of decomposition gas is generated from the resin foam (first temperature range). In this way, it is possible to reduce the amount of decomposition gas generated inside the resin foam per unit time, and to further promote the diffusion of the decomposition gas to the outside of the foam structure. In the case where the heating rate is lowered (that is, the heating rate is changed to the second heating rate) in the first temperature range, the heating rate may return to the first heating rate once the temperature inside the furnace exceeds the upper limit of the first temperature range.

Furthermore, it is preferable to perform the heating process at a heating rate (third heating rate) even lower than the second heating rate in the range where the increasing rate of the generation amount of decomposition gas is high (second temperature range) within the first temperature range where a large amount of decomposition gas is generated. In this way, it is possible to further reduce the amount of decomposition gas generated inside the resin foam per unit time, and to further promote the diffusion of the decomposition gas to the outside of the foam structure.

In the present disclosure, the "temperature range where the increasing rate of the amount of decomposition gas generated from the resin foam is high (second temperature range)" can be evaluated by heating 1.000 g of the resin foam in an oven purged with inert gas, and for each temperature, holding the resin foam at that temperature for one hour, then cooling the resin foam to room temperature, taking the resin foam out and weighing its weight, and comparing the obtained weight with an initial weight measured at room temperature before the heating. Specifically, the weight of the resin foam as a raw material in the heating process is monitored in advance at intervals of 100° C., and the second temperature range is a temperature range where the weight of the resin foam decreases by 20% or more of the initial weight per 100° C. For example, in the case where the weight of the resin foam decreases by 20% or more of the initial weight per 100° C. in both temperature ranges of 300° C. or higher and lower than 400° C. and 400° C. or higher and lower than 500° C., the second temperature range is 300° C. or higher and lower than 500° C.

In the case of where the resin foam as a raw material is a melamine resin foam, the temperature range where the amount of desorbed gas generated from the resin foam is large (first temperature range) is a temperature range of 200° C. or higher and lower than 800° C. as described above. In addition, as a result of our investigation, it was understood that the temperature range where the increasing rate of the amount of desorbed gas generated from the resin foam is high (second temperature range) is a temperature range of 300° C. or higher and lower than 400° C. When the resin foam as a raw material is a melamine resin foam, the heating rate is more preferably 5° C./min or lower in the first temperature range, and particularly preferably 3° C./min or lower in the second temperature range.

Moreover, in the heating process and the carbonization process described later, the atmosphere inside the furnace is made into an inert gas atmosphere or a vacuum to prevent the decomposition reaction between oxygen and the carbon fibers constituting a carbon foam. The furnace being a "vacuum" herein indicates that the degree of vacuum inside the furnace is less than 1 Pa. In the case of inert gas atmosphere, the inside of the furnace is decompressed and evacuated to release air containing oxygen after introducing the resin foam, which is a raw material of carbon foam, into the heat treatment furnace (raw material foam introduction process), and when the inside of the furnace reaches a degree of vacuum of less than 1 Pa and is sufficiently evacuated, inert gas is introduced. In this way, the inside of the furnace can be made into an inert gas atmosphere. When the inside of the furnace is made into an inert gas atmosphere or a vacuum, the heating starts, and the inside of the furnace is decompressed and evacuated in the first temperature range.

Furthermore, in the range of 200° C. or higher and lower than 800° C. where the amount of desorbed gas of the melamine resin foam is large (first temperature range), it is preferable to continue the decompression and evacuation while introducing inert gas into the furnace. The inert gas, such as nitrogen gas or argon gas, flows inside the furnace, thereby promoting the discharge of the decomposition gas generated inside the resin foam.

During the introduction of inert gas, the flow rate of the inert gas is preferably 1 L/min or more, more preferably 3 L/min or more, and particularly preferably 5 L/min or more, from the viewpoint of suppressing defects in the carbon foam. In addition, from the viewpoint of temperature control, the flow rate of the inert gas is preferably 40 L/min or less, more preferably 30 L/min or less, and particularly preferably 20 L/min or less.

Subsequently, in step S3, the resin foam is kept at the heat treatment temperature, which has been reached by raising the temperature, for a predetermined time and carbonized to obtain a carbon foam (carbonization process). In the present disclosure, the heat treatment temperature is a temperature equal to or higher than the softening point of the resin foam as a raw material. For example, when the resin foam is a melamine resin foam, since the softening point of the melamine resin foam is 300° C. to 400° C., the heat treatment temperature is a temperature equal to or higher than the softening point. It is preferably 800° C. or higher, and more preferably 1000° C. or higher. In addition, from the viewpoint of physical fragility caused by high crystallinity, it is preferably 3000° C. or lower, and more preferably 2500° C. or lower.

The time for keeping the resin foam at the heat treatment temperature (heat treatment time) is a time during which the resin foam as a raw material can be completely carbonized. For example, when the resin foam as a raw material is a melamine resin foam, the keeping time is 0.5 hours or longer. It is preferably one hour or longer, and more preferably two hours or longer. In addition, from the viewpoint of productivity, it is preferably five hours or shorter, and more preferably four hours or shorter.

Next, in step S4, the temperature inside the heat treatment furnace is lowered to room temperature (cooling process). From the viewpoint of mitigating the damage to the heaters and insulation in the furnace caused by rapid cooling, the cooling rate from the carbonization temperature of the melamine resin foam is preferably 20° C./min or lower, and more preferably 15° C./min or lower. In addition, from the viewpoint of overall productivity, it is preferably 5° C./min or higher, and more preferably 10° C./min or higher.

Finally, in step S5, the carbon foam is removed from the heat treatment furnace (carbon foam removing process). The carbon foam of the present disclosure can be produced in this way.

Moreover, the heating process and the carbonization process can be performed while applying a compressive load to the resin foam as a raw material, so that it is possible to obtain a carbon foam having a skeleton structure in which carbon fibers spread anisotropically. As described above, a carbon foam with anisotropy is capable of suppressing breakage of carbon fibers, reducing pulverization, and realizing high resilience even when a compressive load is applied thereon.

The compressive load can be applied by placing a weight such as a graphite plate on the resin foam as a raw material. The applied compressive load is preferably 50 Pa or more, and more preferably 200 Pa or more. In addition, it is preferably 2000 Pa or less and more preferably 1500 Pa or less.

When a compressive load is applied to the resin foam as a raw material, the diffusion of the decomposition gas is suppressed by the weight such as the graphite plate. Therefore, during the heating process, it is particularly preferable to reduce the heating rate as compared with the case where no compressive load is applied, and continue the decompression and evacuation while introducing inert gas into the furnace to promote the discharge of the decomposable gas.

For example, when the resin foam as a raw material is a melamine resin foam, it is preferable that the heating rate be 5° C./min or lower in the temperature range of 200° C. or higher and lower than 800° C. (first temperature range), and more preferable that the heating rate be 2° C./min or lower in the temperature range of 300° C. or higher and lower than 400° C. where the increasing rate of the generation amount of desorbed gas is high (second temperature range). Furthermore, it is preferable to supply inert gas such as nitrogen gas or argon gas into the heat treatment furnace in the temperature range of 200° C. or higher and lower than 800° C. (first temperature range).

The compressive stress on the resin foam as a raw material may be applied not only in one direction but also in two directions.

EXAMPLES

The following provides a description of specific examples and comparative examples. However, the present disclosure is not limited to the following examples.

<Preparation of Carbon Form>

Example 1

First, a melamine resin foam (dimensions: 270 mm×270 mm×40 mm) was prepared as a material of carbon foam and introduced into a heat treatment furnace. Next, the inside of the furnace was decompressed and evacuated by a vacuum pump until the degree of vacuum inside the furnace was less than 1 Pa. Subsequently, nitrogen gas was supplied into the furnace at a flow rate of 2 L/min and the inside of the furnace was decompressed and evacuated. At the same time, the temperature inside the furnace was raised to 800° C. at a heating rate of 5° C./min. The degree of decompression inside the furnace was about 700 Pa when the temperature inside the furnace reached 800° C. The supply of nitrogen gas was stopped once the temperature inside the furnace reached 800° C., and the temperature was raised to a heat treatment temperature of 1500° C. at a heating rate of 5° C./min and kept at 1500° C. for one hour to carbonize the melamine resin foam. The degree of decompression inside the furnace was less than 10 Pa when the temperature inside the furnace reached 1500° C. Subsequently, the temperature inside the furnace was lowered to room temperature, the vacuum pump was stopped, and the carbonized melamine resin foam was taken out from the furnace. A carbon foam of Example 1 was prepared in this way. Details of the obtained carbon foam are listed in Table 1.

TABLE 1

|  | Example 1 | Example 2 | Example 3 | Example 4 | Example 5 | Example 6 |
|---|---|---|---|---|---|---|
| Presence of through hole of 10 mm² or more | No | No | No | No | No | No |
| Dimensions after carbonization (mm) | 130 × 130 | 155 × 155 | 160 × 170 | 125 × 130 | 130 × 135 | 130 × 130 |
| Area (cm²) | 169.0 | 240.2 | 272.0 | 162.5 | 175.5 | 169.0 |
| Ratio R ($N_f/N_n$) | 1.45 | 1.46 | 1.45 | 1.45 | 1.45 | 1.45 |
| Density of node portion (/mm³) | 19452 | 62375 | 563012 | 19558 | 19691 | 19724 |
| Average orientation angle in x direction (°) | 58 | 60.5 | 62 | 58.2 | 58 | 58 |
| Average orientation angle in y direction (°) | 57.8 | 56.7 | 55.3 | 57.9 | 57.7 | 57.8 |
| Average orientation angle in z direction (°) | 57.6 | 55.3 | 56.3 | 57.5 | 57.7 | 57.4 |
| Minimum value of $\theta_d$ (°) | 0.2 | 3.8 | 5.7 | 0.3 | 0.3 | 0.2 |
| Carbon trunk thickness (fiber diameter, μm) | 2.1 | 2.0 | 2.3 | 2.1 | 1.9 | 2.0 |
| Bulk density (kgm⁻³) | 6.0 | 27.0 | 43.0 | 6.0 | 6.0 | 6.0 |
| Carbon content (mass %) | 99 | 99 | 99 | 99 | 99 | 99 |
| Resistance value (Ω) | 7.88 | 5.00 | 15.60 | 7.69 | 8.01 | 7.79 |

|  | Comparative Example 1 | Comparative Example 2 | Comparative Example 3 | Comparative Example 4 | Comparative Example 5 |
|---|---|---|---|---|---|
| Presence of through hole of 10 mm² or more | Yes | No | Yes | Yes | No |
| Dimensions after carbonization (mm) | 125 × 130 | 42 × 42 | 155 × 160 | 150 × 150 | 50 × 52 |
| Area (cm²) | 162.5 | 17.6 | 248.0 | 225.0 | 26.0 |
| Ratio R ($N_f/N_n$) | — | 1.44 | — | — | 1.46 |
| Density of node portion (/mm³) | — | 19354 | — | — | 19765 |

TABLE 1-continued

| | | | | | |
|---|---|---|---|---|---|
| Average orientation angle in x direction (°) | — | 58.1 | — | — | 60.4 |
| Average orientation angle in y direction (°) | — | 57.7 | — | — | 57.1 |
| Average orientation angle in z direction (°) | — | 57.6 | — | — | 56.8 |
| Minimum value of $\theta_d$ (°) | — | 0.4 | — | — | 3.3 |
| Carbon trunk thickness (fiber diameter, μm) | — | 2.0 | — | — | 2.1 |
| Bulk density (kgm$^{-3}$) | — | 6.0 | — | — | 6.0 |
| Carbon content (mass %) | — | 99 | — | — | 99 |
| Resistance value (Ω) | — | 12.35 | — | — | 26.95 |

Example 2

A carbon foam of Example 2 was prepared as in Example 1. However, a graphite plate (dimensions: 270 mm×270 mm×4 mm) was placed on the melamine resin foam and the melamine resin foam was introduced into the heat treatment furnace with a compressive load of 70 Pa applied thereon. In addition, the heating rate was 2.5° C./min in the temperature range of 300° C. or higher and lower than 400° C. (second temperature range). The other conditions were the same as in Example 1. Details of the obtained carbon foam are listed in Table 1.

Example 3

A carbon foam of Example 3 was prepared as in Example 2. However, the dimensions of the melamine resin foam were 270 mm×270 mm×10 mm, a graphite plate (dimensions: 270 mm×270 mm×16 mm) was placed on the melamine resin foam, and the melamine resin foam was introduced into the heat treatment furnace with a compressive load of 280 Pa applied thereon. The other conditions were the same as in Example 2. Details of the obtained carbon foam are listed in Table 1.

Example 4

A carbon foam of Example 4 was prepared as in Example 1. However, nitrogen gas was not supplied into the furnace. The other conditions were the same as in Example 1. Details of the obtained carbon foam are listed in Table 1.

Example 5

A carbon foam of Example 5 was prepared as in Example 4. However, the heating rate was 3° C./min in the temperature range of 200° C. or higher and lower than 800° C. (first temperature range). The other conditions were the same as in Example 4. Details of the obtained carbon foam are listed in Table 1.

Example 6

A carbon foam of Example 6 was prepared as in Example 5. However, the heating rate was 1° C./min in the temperature range of 300° C. or higher and lower than 400° C. (second temperature range). The other conditions were the same as in Example 5. Details of the obtained carbon foam are listed in Table 1.

Comparative Example 1

A carbon foam of Comparative Example 1 was prepared as in Example 1. However, nitrogen gas was supplied (flow rate: 2 L/min) without performing decompression or evacuation, and gas was discharged out of the furnace by natural discharge. The other conditions were the same as in Example 1. Note that under these conditions, the inside of the furnace was in a pressure environment equal to or higher than atmospheric pressure. Details of the obtained carbon foam are listed in Table 1.

Comparative Example 2

A carbon foam of Comparative Example 2 was prepared as in Comparative Example 1. However, the dimensions of the melamine resin foam were 90 mm×90 mm×40 mm. The other conditions were the same as in Comparative Example 1. Details of the obtained carbon foam are listed in Table 1.

Comparative Example 3

A carbon foam of Comparative Example 3 was prepared as in Example 2. However, nitrogen gas was supplied (flow rate: 5 L/min) without performing decompression or evacuation, and gas was discharged by natural discharge. The other conditions were the same as in Example 2. Details of the obtained carbon foam are listed in Table 1.

Comparative Example 4

A carbon foam of Comparative Example 4 was prepared as in Example 3. However, nitrogen gas was supplied (flow rate: 5 L/min) without performing decompression or evacuation, and gas was discharged by natural discharge. The other conditions were the same as in Example 3. Details of the obtained carbon foam are listed in Table 1.

Comparative Example 5

A carbon foam of Comparative Example 5 was prepared as in Comparative Example 4. However, the dimensions of the melamine resin foam were 90 mm×90 mm×10 mm. The other conditions were the same as in Comparative Example 4. Details of the obtained carbon foam are listed in Table 1.

<Detection of Through Hole>

The carbon foams of Examples 1 to 6 and Comparative Examples 1 to 5 were visually inspected and inspected by a pinhole inspection machine (a sheet inspection device manufactured by OMRON Corporation) to detect through holes on the surface of the carbon foam. As a result, through holes with an area of 10 mm$^2$ or more were not detected in the carbon foams of Examples 1 to 6 and Comparative Examples 2 and 5. On the other hand, it was found by visual inspection that the carbon foams of Comparative Examples 1, 3 and 4 had through holes whose area was clearly more than 10 mm². In addition, in Examples 1 to 6, the area of the region having no through holes of 2000 mm² or more was the same as the area of the obtained carbon foam. The measurement results are listed in Table 1.

Figure 3:
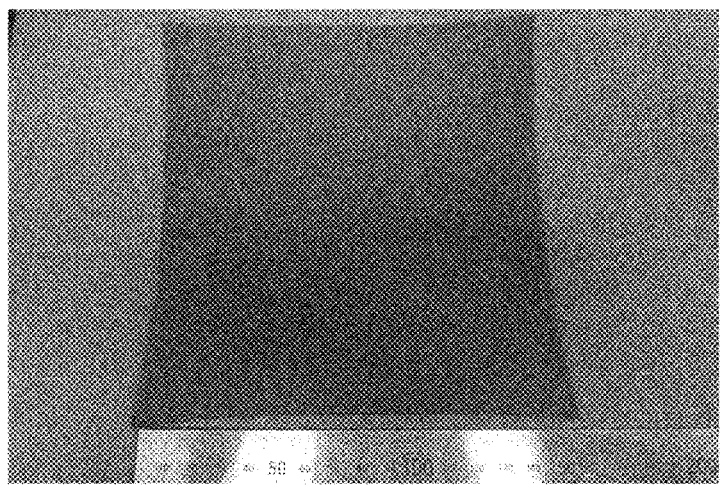
FIG. 3 is an external view of the carbon foam of Example 3.
Figure 4:
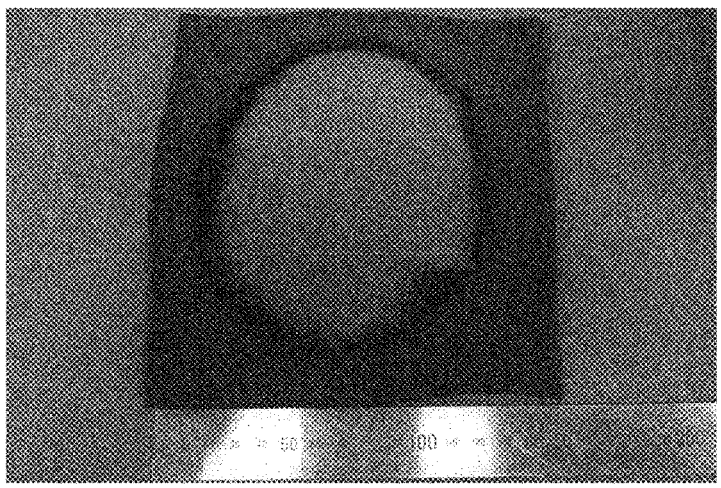
FIG. 4 is an external view of the carbon foam of Comparative Example 2.
Figure 5:
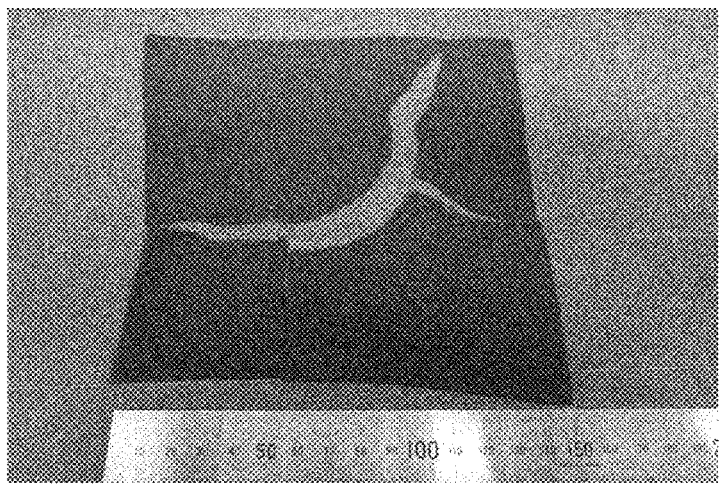
FIG. 5 is an external view of the carbon foam of Comparative Example 4.

FIGS. 3 to 5 illustrate external views of carbon foams of Example 3, Comparative Example 3 and Comparative Example 4, respectively. As is apparent from these figures, the carbon foam of Example 3 illustrated in FIG. 3 has a surface where the area without defects on the entire surface is 100 cm² or more. On the other hand, for the carbon foam of Comparative Example 3 where the decompression and evacuation was not performed, the central part was completely burned out, and a large through hole whose area was clearly more than 10 mm² was formed, as illustrated in FIG. 4. In addition, for the carbon foam of Comparative Example 4 where the decompression and evacuation was not performed, the center part was partially burned out and the carbon foam was broken at the burned part, as illustrated in FIG. 5. The carbon foam of Comparative Example 1 was the same as this one.

<SEM Observation>

Figure 6:
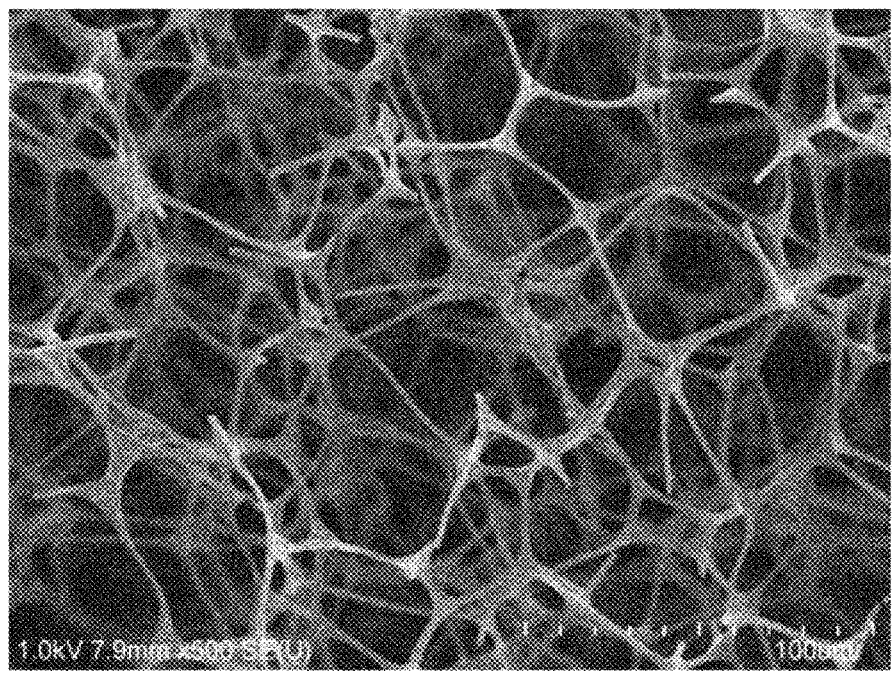
FIG. 6 is a SEM image of the carbon foam of Example 1.
Figure 7A:
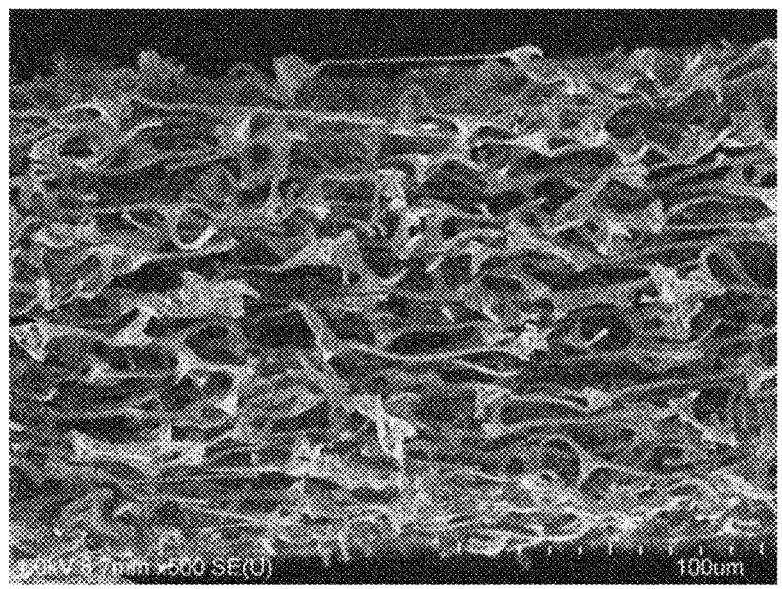
FIGS. 7A and 7B are SEM images of the carbon foam of Example 3, where
Figure 7B:
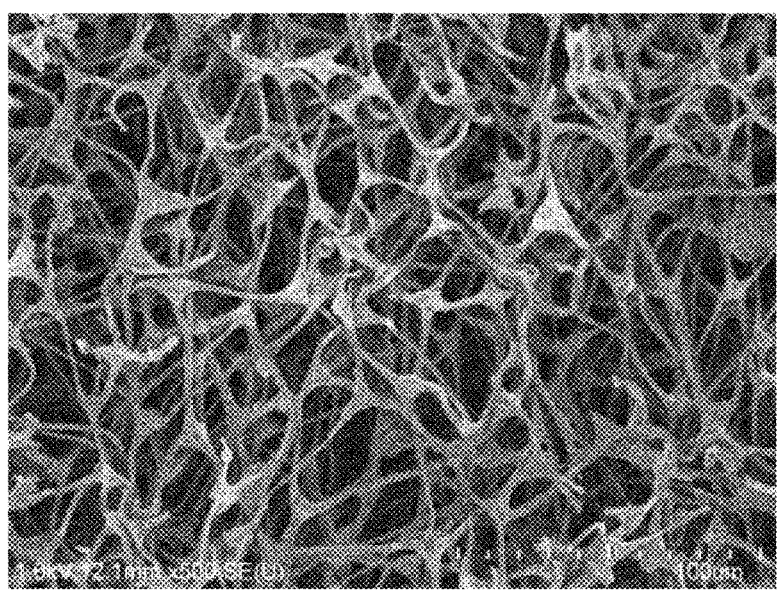

FIG. 6 and FIGS. 7A and 7B illustrate SEM images of the carbon foams of Examples 1 and 3 respectively, where FIG. 6 relates to a cross section, FIG. 7A relates to a cross section (a cross section in the application direction of the compressive load), and FIG. 7B relates to a surface (a surface perpendicular to the application direction of the compressive load). The magnification is 500 times for all SEM images.

As is apparent from FIGS. 7A and 7B, in the carbon foam of Example 3, the linear portions of the carbon fibers are joined at the node portions, and the linear portions are oriented in the direction perpendicular to the application direction of the compressive load. On the other hand, in the carbon foam of Example 1 illustrated in FIG. 6, the linear portions of the carbon fibers are isotropically oriented. The thickness of the carbon trunk can be measured from these SEM images. In that case, the thickness of the trunk can be accurately calculated with a magnification of 10000 times or more.

<Structural Analysis by X-Ray CT>

Figure 8:
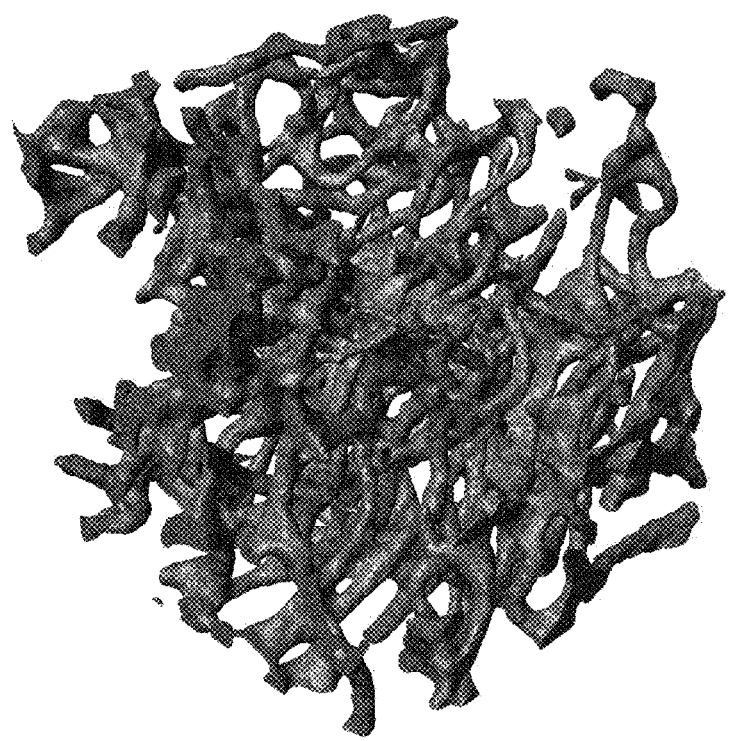
FIG. 8 is an X-ray CT analysis image obtained with the carbon foam of Example 1.
Figure 9:
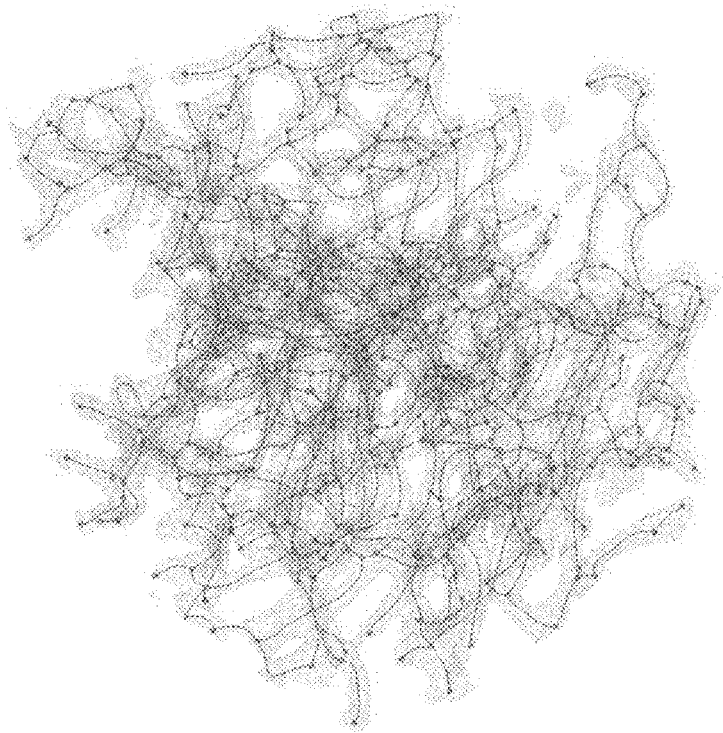
FIG. 9 is an image obtained by subjecting the image of FIG. 8 to image processing for line and node detection.

The carbon foams of Examples 1 to 6 and Comparative Examples 2 and 5 were subjected to structural analysis by X-ray CT. Specifically, in order to facilitate X-ray imaging, electroless copper plating was first performed on each of the carbon foams of the Examples and Comparative Examples. Subsequently, a specimen was collected from each carbon foam, and structural analysis was performed on the collected specimens using a high-resolution 3D X-ray microscope nano3DX (manufactured by Rigaku Corporation). The following describes the electroless plating conditions and the X-ray CT analysis conditions in detail. As an example of the results, FIG. 8 is an X-ray CT analysis image obtained with the carbon foam of Example 1, and FIG. 9 is an image obtained by subjecting the image of FIG. 8 to image processing for line and node detection.

The following describes the electroless plating conditions and the X-ray CT analysis conditions in detail.

[Electroless Plating Condition]

The sample was immersed in OPC Condiclean MA (manufactured by Okuno Chemical Industries Co., Ltd., diluted to 100 mL/L with distilled water) at 70° C. for five minutes, and then washed with distilled water for one minute. Subsequently, the sample was immersed in OPC Predip 49L (manufactured by Okuno Chemical Industries Co., Ltd., diluted to 10 mL/L with distilled water and added with 98% sulfuric acid at 1.5 mL/L) at 70° C. for two minutes, and then washed with distilled water for one minute. Subsequently, the sample was immersed in a solution, which was obtained by mixing OPC Inducer 50 AM (manufactured by Okuno Chemical Industries Co., Ltd., diluted to 100 mL/L with distilled water) and OPC Inducer 50 CM (manufactured by Okuno Chemical Industries Co., Ltd., diluted to 100 mL/L with distilled water) at 1:1, at 45° C. for five minutes, and then washed with distilled water for one minute. Subsequently, the sample was immersed in OPC-150 Crystal MU (manufactured by Okuno Chemical Industries Co., Ltd., diluted to 150 mL/L with distilled water) at room temperature for five minutes, and then washed with distilled water for one minute. Subsequently, the sample was immersed in OPC-BSM (manufactured by Okuno Chemical Industries Co., Ltd., diluted to 125 mL/L with distilled water) at room temperature for five minutes. Subsequently, the sample was immersed in a solution, which was obtained by mixing Chemical Copper 500A (manufactured by Okuno Chemical Industries Co., Ltd., diluted to 250 mL/L with distilled water) and Chemical Copper 500B (manufactured by Okuno Chemical Industries Co., Ltd., diluted to 250 mL/L with distilled water) at 1:1, at room temperature for ten minutes, and then washed with distilled water for five minutes. Subsequently, the sample was subjected to vacuum drying at 90° C. for 12 hours to dry the water.

[X-Ray Condition]
X-ray target: Cu
X-ray tube voltage: 40 kV
X-ray tube current: 30 mA

[Imaging Condition]
Number of projections: 1500 sheets
Rotation angle: 180°
Exposure time: 20 seconds/sheet
Spatial resolution: 0.54 µm/pixel

[X-Ray CT Analysis Condition]
By using the median filter, the obtained three-dimensional images were processed in one pixel, and the processed images were binarized using Otsu's algorithm.

Subsequently, Centerline Editor (Ver. 7) of Simpleware software manufactured by JSOL Corporation with default setting values was used to remove lines of 2.16 µm or less as noise, and then the number $N_n$ of the node portions and the number $N_1$ of the linear portions in a measurement field of view of 300 µm×300 µm×300 µm were determined.

With the above structural analysis, the number $N_n$ of the node portions and the number $N_1$ of the linear portions included in the specimen, the density of the node portions, and the average values of the orientation angle with respect to the three mutually orthogonal directions (x, y, z) were determined. The results are listed in Table 1. The orientation angles in Table 1 were obtained by setting the application direction of the compressive load as x direction and the directions perpendicular to the application direction of the compressive load as y direction and z direction. In addition, the minimum value of $\theta_d$ in Table 1 is the minimum value of the difference between the orientation angle with respect to the x direction and the orientation angle with respect to the y direction or the z direction.

According to Table 1, R of the carbon foams of Examples 1 to 6 and Comparative Examples 2 and 5 are in the range of 1.4 to 1.5. With respect to the other materials such as the structure of carbon fiber nonwoven fabric, R is 1.29 or less, not in the range of 1.4 to 1.5. This indicates that the range is a characteristic numerical value because of the structure of the carbon foam of the present disclosure.

<Measurement of Bulk Density>

The dimensions of the carbon foam were measured using vernier calipers, and the obtained dimensions were used to determine the bulk volume $V_{bulk}$ of the carbon foam. Next, the mass M of the carbon foam was measured using a precision balance. With the obtained mass M and bulk volume $V_{bulk}$, the bulk density $\rho_{bulk}$ (kgm$^{-3}$) of the carbon foam was determined using the following equation (1). The results are listed in Table 1.

$$\rho_{bulk} = M/V_{bulk} \quad (1)$$

<Carbon Content>

The carbon content of the carbon foam could be obtained by X-ray fluorescence measurement. An X-ray fluorescence analyzer ZSX-100E (wavelength dispersion type, Rh tubular lamp) manufactured by Rigaku Corporation was used, and the analysis diameter was 20 mmφ.

<Evaluation of Conductivity>

The resistance values of the carbon foams of Examples 1 to 6 and Comparative Examples 2 and 5 were measured. Specifically, the resistance value was measured by respectively bonding a 10 mm×10 mm copper plate to the tip of two electrodes used for resistance measurement, pressing the surface of the copper plate opposite to the surface bonded to the electrode of the two electrodes against a carbon foam with an interval of 10 cm, and measuring the resistance value with a digital multimeter 7461A. At that time, Comparative Examples 2 and 5 were measured by arranging two electrodes so as to straddle two or three carbon foams. The results are listed in Table 1.

By comparing the results of Example 1 and Comparative Example 2, and the results of Example 3 and Comparative Example 5 of Table 1, it is understood that Examples 1 and 3 in which the carbon foam is composed of a single member and the carbon fibers are connected in a unified manner had a low resistance value and high conductivity.

INDUSTRIAL APPLICABILITY

According to the present disclosure, it is possible to obtain a carbon foam having a surface with a large area and few defects, which is useful in electrode applications, filter applications, heat insulating material applications, and other applications.

REFERENCE SIGNS LIST

H through hole
S surface

The invention claimed is:

1. A carbon foam comprising linear portions and node portions joining the linear portions, wherein
the linear portions have a diameter of 0.1 μm or more and 10.0 μm or less,
the carbon foam has a surface with an area of 100 cm$^2$ or more,
the carbon foam has a three-dimensional network structure,
the carbon foam has a bulk density of 3.0 kgm$^{-3}$ or more and 400 kgm$^{-3}$ or less, and
the carbon foam has a porosity of 70% or more.

2. A carbon foam comprising linear portions and node portions joining the linear portions, wherein
the linear portions have a diameter of 0.1 μm or more and 10.0 μm or less,
the carbon foam has no through holes with an area of 2000 mm$^2$ or more,
the carbon foam has a three-dimensional network structure,
the carbon foam has a bulk density of 3.0 kgm$^{-3}$ or more and 400 kgm$^{-3}$ or less, and
the carbon foam has a porosity of 70% or more.

3. The carbon foam according to claim 2, wherein the carbon foam comprises a region of 4000 mm$^2$ or more having no through holes with an area of 2000 mm$^2$ or more.

4. The carbon foam according to claim 2, having no through holes with an area of 1000 mm$^2$ or more.

5. The carbon foam according to claim 2, wherein at least a part of the carbon foam has a density of the node portions of 15,000/mm$^3$ or more.

6. The carbon foam according to claim 2, wherein the linear portions have a diameter of 0.1 μm or more and 5.0 μm or less.

7. The carbon foam according to claim 2, wherein at least a part of the carbon foam has a density of the node portions of 30,000/mm$^3$ or more.

8. The carbon foam according to claim 2, wherein
in at least a part of the carbon foam, a thickness direction of the carbon foam is defined as x direction, a direction perpendicular to the x direction is defined as y direction, and a direction perpendicular to the x direction and the y direction is defined as z direction, and
for the linear portions in a region of 300 μm×300 μm×300 μm,
an average value of orientation angle with respect to the x direction is defined as $\theta_{avex}$,
an average value of orientation angle with respect to the y direction is defined as $\theta_{avey}$, and
an average value of orientation angle with respect to the z direction is defined as $\theta_{avez}$, then
a difference $\theta_d$ between the maximum value and the minimum value of the $\theta_{avex}$, the $\theta_{avey}$ and the $\theta_{avez}$ is 3° or more.

9. The carbon foam according to claim 1, wherein the carbon foam comprises a region of 4000 mm$^2$ or more having no through holes with an area of 2000 mm$^2$ or more.

10. The carbon foam according to claim 1, having no through holes with an area of 1000 mm$^2$ or more.

11. The carbon foam according to claim 1, wherein at least a part of the carbon foam has a density of the node portions of 15,000/mm$^3$ or more.

12. The carbon foam according to claim 1, wherein the linear portions have a diameter of 0.1 μm or more and 5.0 μm or less.

13. The carbon foam according to claim 1, wherein at least a part of the carbon foam has a density of the node portions of 30,000/mm$^3$ or more.

14. The carbon foam according to claim 1, wherein
in at least a part of the carbon foam, a thickness direction of the carbon foam is defined as x direction, a direction perpendicular to the x direction is defined as y direction, and a direction perpendicular to the x direction and the y direction is defined as z direction, and
for the linear portions in a region of 300 μm×300 μm×300 μm,
an average value of orientation angle with respect to the x direction is defined as $\theta_{avex}$,
an average value of orientation angle with respect to the y direction is defined as $\theta_{avey}$, and
an average value of orientation angle with respect to the z direction is defined as $\theta_{avez}$, then a difference $\theta_d$ between the maximum value and the minimum value of the $\theta_{avex}$, the $\theta_{avey}$, and the $\theta_{avez}$ is 3° or more.

\* \* \* \* \*